United States Patent Office
3,163,615
Patented Dec. 29, 1964

3,163,615
AMIDE INTERPOLYMER CONTAINING
UNSATURATED POLYESTER
Kazys Sekmakas, Chicago, Ill., assignor to DeSoto Chemical Coatings, Inc., Chicago, Ill., a corporation of Delaware
No Drawing. Filed June 7, 1961, Ser. No. 115,330
13 Claims. (Cl. 260—22)

The present invention relates to copolymers of ethylenically unsaturated polyesters with other monoethylenically unsaturated monomers and especially to heat-hardenable copolymers of ethylenically unsaturated polyesters with an acrylamide and at least one other monoethylenically unsaturated monomer, the acrylamide-containing copolymer or interpolymer desirably being in the form of alkylolated interpolymers, especially etherified alkylolated interpolymers. The new copolymers or interpolymers in accordance with the invention are especially useful in organic solvent solution coating compositions.

Etherified alkylolated acrylamide-containing interpolymers have previously been used in organic solvent solution coating compositions. Unfortunately, when the interpolymer is the sole film-forming component of the coating, it has not been possible to obtain a fully satisfactory combination of properties. Primarily, when the coatings were hard, they were brittle. On the other hand, when the coatings were adequately flexible, they were unduly soft. In an effort to provide a more desirable balance of physical properties, the interpolymers have been blended by the art with various other resinous materials. These blends are effective to some extent, but fully satisfactory systems have not been achieved.

As one effort in the direction of blends, etherified alkylolated acrylamide-containing interpolymers have been physically blended with alkyd resins, including oil-modified alkyd resins, in organic solvent solution coating compositions. The alkyd-interpolymer blends known to the art have not been fully compatible, the lack of compatibility and the very existence of a two component system leading to numerous inadequacies among which are:

(1) Inadequate gloss,
(2) Poor pigmentation including a tendency for pigmented compositions to drift in color due to pigment flocculation,
(3) Inadequate flexibility in coatings of given hardness,
(4) Inadequate adhesion to substrates,
(5) Poor blocking resistance (softens at elevated temperature because the two components do not cure at the same rate),
(6) Poor resistance to excessive baking or to postcuring leading to discoloration and loss of flexibility and gloss on overbaking or aging.

The invention employs new interpolymers which include copolymerized ethylenically unsaturated polyester resin to provide a coating system in which the film forming resin is a single component having a balance of physical properties not previously attainable. As a result, problems of compatibility and the vagaries of two components are completely eliminated to provide improved gloss, to provide darker colors and tints having superior resistance to pigment flocculation and, hence, to color drift, improved resistance to "blocking," better adhesion, more flexible and impact resistant coatings at any given level of hardness and greatly enhanced resistance to overbaking and postcuring. The new interpolymers form clear organic solvent solutions which may be pigmented if desired. In solution, the new interpolymers exhibit improved compatibility with amine resins.

In accordance with the invention, a copolymerizable unsaturated polyester is copolymerized with monoethylenically unsaturated monomers (preferably monomers containing the $CH_2=C<$ group), and especially with an acrylamide and at least one other monoethylenically unsaturated monomer to provide a non-gelled solvent-soluble copolyme or interpolymer. When the interpolymer or one of the monomer components of the interpolymer includes amido hydrogen atoms, these are replaced by the structure

wherein R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical. Preferably, R is hydrogen and $R_1$ is an alkyl radical containing from 3–8 carbon atoms.

As will be more fully appreciated hereinafter, considerable variation is permissible in the kind and ratio of monoethylenically unsaturated monomers which are used, the aldehyde modifying agent and the etherifying agent. Moreover, there is also a considerable variation which can be made in the specific nature of the copolymerizable unsaturated polyester.

While it is preferred to employ acrylamide in proportions of from 5 to 45%, preferably from 5 to 30% by weight, with unsaturated monomers containing the $CH_2=C<$ group, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used. While the preferred unsaturated monomers interpolymerized with acrylamide do contain the $CH_2=C<$ group and it is preferred to use combinations of the monomers which form hard polymers such as styrene, vinyl toluene and methyl methacrylate which form soft polymers such as monoethylenically unsaturated carboxylic acid esters having a terminal aliphatic hydrocarbon group containing from 2-20 carbon atoms, illustrated by ethyl acrylate, butyl acrylate, 2-ethylhexyl acrylate, and stearyl acrylate, the invention is not restricted to the selection of monomers containing the $CH_2=C<$ group or to the selection of preferred combinations of monomers. Thus, monomers which do not contain the $CH_2=C<$ group may be interpolymerized with acrylamide either alone or in the presence of monomers which do contain the $CH_2=C<$ group. Particular attention is directed to maleic acid or anhydride, maleic acid monoesters and diesters, butene-2 and fatty acids containing conjugated unsaturation such as dehydrated castor oil fatty acids which are useful in the production of interpolymers with acrylamide. Still other monomers which may be used are acrylic acid, methacrylic acid, 1,3-butadiene, vinyl ethers such as n-butyl vinyl ether, glycidyl methacrylate, etc.

Numerous ethylenically unsaturated polyesters may be employed for copolymerization in accordance with the invention, it being understood that these polyesters are polyethylenically unsaturated and not monoethylenically unsaturated. The unsaturation can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization with acrylamide and the other monoethylenically unsaturated monomers which are copolymerized. Incorporation of monocarboxylic acids is facilitated by the use of glycerine in the production of the polyester. When the glycerine polyester is preformed, the monoacid reacts with the secondary hydroxyl group of the glycerine residue, but, as is known, the polybasic acid, the glycerine and the monoacid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha-beta unsaturation, (2) beta-gamma unsaturation, or (3) conjugated unsaturation. Preferably, the unsaturation is in a chain not a part of the linear polyester backbone to thereby reduce the danger of gelation.

Broadly, the unsaturated polyester resin should contain about 0.005 to 0.40 gram mol of ethylenically unsaturated component per 100 grams of polyester. Of course, the precise preferred proportion of unsaturation will vary depending on the reactivity of the unsaturated component (maleic acid is more reactive than crotonic acid). Moreover, practical aspects of processing must be kept in mind since, with less unsaturation, one may copolymerize for longer periods of time and/or more vigorous conditions. With more unsaturation, there is a tendency to gel, especially with more reactive materials such as maleic anhydride or acid. However, one can terminate the reaction before gelation, especially when the reaction is carefully supervised, or the reaction may be effected under very mild conditions. Preferably, and when using polyesters containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.03–0.3 gram mol of unsaturated component per 100 grams of polyester.

The polyester may be made to include excess carboxyl or hydroxyl functionality. It is preferred, however, to employ hydroxy-functional polyester resins, especially those having an hydroxyl functionality indicated by an hydroxyl number of from 10–300 (milligrams of KOH to saponify 1 gram of resin).

In accordance with the invention, the use of ethylenically unsaturated polyesters in which the unsaturation is substantially confined to side chains including terminal groups in the linear polyester structure is a preferred feature of the invention. When the unsaturation is in the polyester backbone, as by the use of maleic acid, the interpolymers produced tend to gel and it is difficult to provide non-gelled interpolymers having desirable properties. It is far easier to use crotonic acid or allyl alcohol to provide a less reactive polyester which can be more easily and satisfactorily incorporated in the interpolymer molecule.

The unsaturated polyester is preferably used in an amount of from 5–50%, passed on the total weight of monomers subjected to copolymerization.

While the molecular weight of the unsaturated polyester is of secondary significance so long as the polyester is not gelled, it is desirable to employ polyesters which have a viscosity in n-butanol at 80% solids in the range of from C to Z-6, preferably in the range of from V to Z-2 measured on the Gardner-Holdt scale at 25° C.

The proportion of oil which is incorporated in the polyester is of secondary significance in the invention. Indeed, oil may be entirely omitted. However, it is preferred to have a proportion of oil present. Thus, the polyester may include various proportions of oil such as: (1) short oil (20–30% by weight of oil); (2) medium oil (30–60% by weight of oil); and (3) long oil (60–70% by weight of oil). Short oil polyesters are preferred.

The interpolymers of the invention are desirably produced by a single stage solution copolymerization which is more fully described in my prior copending application Serial No. 100,804, filed April 5, 1961, the disclosure of which is hereby incorporated by reference. Thus, organic solvent, aldehyde, unsaturated polyester, an acrylamide and at least one other monoethylenically unsaturated monomer are reacted with one another in the presence of heat and in the presence of a basic catalyst and a free-radical generating polymerization catalyst, and polymerization and alkylolation take place simultaneously. Preferably, the monomers are added to the organic solvent solution which is added slowly and at a uniform rate (desirably by continuous addition) to permit more precise control of the reaction and to provide a more uniform interpolymer product. Also continuous monomer addition enables temperature control during the reaction despite the highly exothermic reaction which normally occurs. In the presence of alcohol, continuous removal of water, as by refluxing coupled with azeotropic distillation, etherification takes place at the same time and at least some of the methylol groups in the alkylolated product are etherified.

The alkaline catalyst is essential to the single stage reaction, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed.

Any free-radical generating polymerization catalyst may be used, the selection of catalyst being determined by the desired temperature of the polymerization reaction. The important point is that the agent liberate free radicals under the conditions of polymerization so that the addition polymerization is facilitated.

Thus, copolymerization catalysts which generate free radicals starting at low temperatures, e.g., from 30–50° C. are usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

Suitable catalysts which are active to begin generating free radicals at somewhat more elevated temperatures of about 60° C. are illustrated by t-butyl hydroperoxide, methyl amyl ketone peroxide, acetyl hydroperoxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Preferably, free-radical generating catalysts which become active at still more elevated temperatures of about 100° C. are used in accordance with the invention, these being illustrated by t-butyl perphthalic acid, p-chlorobenzoyl peroxide, t-butyl peracetate, dibenzal diperoxide and di-t-butyl peroxide.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Etherification of the aldehyde-modified amide interpolymer is preferred, but not essential. Lower alcohols containing up to 10 carbon atoms, especially butanol, are preferred for etherification and the etherification reaction may be carried out up to 100% of the alkylol radical present in the interpolymer although partial etherification is preferred. The degree of etherification is easily controlled in accordance with the invention by adjusting the proportion of alkaline catalyst, such control being a feature of the invention. When less than 100% etherification is effected, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a saturated aliphatic hydrocarbon radical introduced by the aldehyde modifying agent and R$_1$ is the residue of the etherifying alcohol.

The advantages of the invention will be particularly apparent from the examples which follow in which copolymers including copolymerizable unsaturated polyester as a component of the copolymer are compared directly as to film properties with the closest possible corresponding mixture of acrylamide interpolymer (not including the polyester) physically blended with the same unsaturated polyester. To complete the analysis, the physical blend has also been cooked to determine whether this variable is of any importance.

EXAMPLE 1

*The Unsaturated Polyester Resin Component*

An oil-modified polyester resin was prepared from the following components:

| | Parts by weight |
|---|---|
| Adipic acid | 100 |
| Isophthalic acid | 530 |
| Crotonic acid | 200 |
| Tall oil fatty acids | 382 |
| Glycerine | 420 |
| Polyol (see Note 1) | 130 |
| Dehydrated castor oil | 270 |

NOTE 1.—Reaction product of 1 mol of bisphenol A-[2,2'-bis(p-hydroxyphenylpropane)] with 2 mols of ethylene oxide.

The castor oil, tall oil fatty acids, glycerine, and 60% of the isophthalic acid are charged to a reactor and heated to 420° F. The temperature is maintained at 420° F. until a sample forms a clear pill when cooled to room temperature. The reaction mixture is then cooled to 350° F. and adipic acid, polyol and 40% of the isophthalic acid are added and the mixture is heated to 430° F. and held at this temperature until the acid value is reduced to 10. The product is then cut to 80% solids with n-butanol to provide a solution having the following characteristics:

| | |
|---|---|
| Solids (percent) | 80.7 |
| Viscosity (Gardner-Holdt) | X |
| Color (Gardner-Holdt) | 10 |
| Acid value (non-volatile) | 10.2 |

EXAMPLE 2

Interpolymer consisting of 16% polyester resin, 20% styrene, 15% methyl methacrylate, 36% of ethyl acrylate, and 13% acrylamide.

| Charge composition: | Grams |
|---|---|
| Xylol | 233 |
| n-Butanol | 150 |
| 40% formaldehyde solution in n-butanol | 75 |
| Acrylamide | 130 |
| n-Butanol | 160 |
| Butyl Cellosolve | 280 |
| 40% formaldehyde solution in n-butanol | 200 |
| Styrene | 200 |
| Methyl methacrylate | 150 |
| Ethyl acrylate | 360 |
| Polyester of Example 1 | 200 |
| Triethyl amine | 3 |
| Di-tertiary butyl peroxide | 5 |
| Azobisbutyronitrile | 5 |
| Tertiary-dodecyl mercaptan | 15 |

*Procedure of Polymerization*

Charge 220 grams of xylol, 150 grams of butanol and 75 grams of 40% formaldehyde solution in butanol into a reactor equipped with an agitator, condenser, Dean-Stark trap, thermometer, and nitrogen inlet.

The initial charge is heated to reflux temperature (235–240° F.). Then 130 grams of acrylamide are dissolved in 280 grams of butyl Cellosolve and 160 grams of n-butanol and this solution is premixed with 200 grams of 40% formaldehyde solution in n-butanol, 200 grams of styrene, 150 grams of methyl methacrylate, 360 grams of ethyl acrylate and 200 grams of the polyester of Example 1 to provide a monomer blend.

To this monomer blend add 5 grams of di-tertiary-butyl peroxide, 5 grams azobisbutyronitrile, 3 grams triethyl amine and 15 grams tertiary-dodecyl mercaptan. Dodecyl mercaptan is a chain-terminating agent.

The above monomer blend including catalysts and chain terminating agent is added to the reactor over a 2½ hour period of time and the mixture is maintained at 245–255° F. while concomitantly removing water by azeotropic distillation until the viscosity of a cooled sample is W on the Gardner-Holdt scale.

The resulting interpolymer has the following physical characteristics:

| | |
|---|---|
| Solids (percent) | 49.0 |
| Viscosity (Gardner-Holdt) | W |
| Color (Gardner-Holdt) | 2 |

The resin of Example 2 is utilized in an enamel formulated containing 28% titanium dioxide and 32% non-volatile resin. The resin is ground in a pebble mill to obtain a 7½ N.S. grind gauge reading. The resin is used alone and in combination with various modifying resins as set forth in Table I, in which a 0.003″ draw down of the enamel is made on bare steel panels and baked for 20 minutes at 325° F.

TABLE I

| Modifier | Percent Modification | Percent Interpolymer | Gloss and Appearance | Pencil Hardness | Flexibility | Impact |
|---|---|---|---|---|---|---|
| None | | 100 | Excellent | H-2H | V. Good | Passed 20 in lbs. |
| Benzoguanamine Resin. (See Note 1.) | 25 | 75 | do | 2H-3H | Good | Do. |
| Epoxy Resin. (See Note 2.) | 25 | 75 | do | H | Excellent | Do. |

NOTE 1.—The benzoguanamine-formaldehyde resin is a condensation product of 4 mols of formaldehyde with 1 mol of benzoguanamine in the presence of excess butanol and an acid catalyst to provide a heat-hardenable resin etherified with butanol to provide solvent solubility. The resin is utilized as a 60% resin solids solution of benzoguanamine-formaldehyde resin in a 50/50 weight ratio mixture of butanol/xylol.

NOTE 2.—The epoxy resin is a substantially diglycidyl ether of 2,2'-bis(p-hydroxyphenylpropane) having a molecular weight of about 1,000, an epoxide equivalent weight of about 500 (grams per epoxide equivalent weight), and a melting point of from 65–75° C.

EXAMPLE 3

An oil free polyester resin is prepared from the following components:

| | Parts by weight |
|---|---|
| 2-ethyl hexoic acid | 100 |
| Adipic acid | 320 |
| Phthalic anhydride | 600 |
| Maleic anhydride | 150 |
| Diethylene glycol | 890 |

All of the ingredients are charged to a reactor and heated to 410° F., using a nitrogen sparge. The reaction mixture is maintained at 410° F. until the acid value is lowered to 40.

EXAMPLE 4

Interpolymer consisting of 30% polyester (Example 3), 10% acrylamide, 20% styrene, 5% methyl methacrylate, 25% ethyl acrylate, and 10% 2-ethyl hexyl acrylate.

| Charge composition: | Parts by weight |
|---|---|
| Xylol | 335 |
| n-Butanol | 205 |
| 40% formaldehyde solution in n-butanol | 75 |
| Acrylamide | 100 |
| n-Butanol | 130 |
| Butyl Cellosolve | 215 |
| 40% formaldehyde solution in n-butanol | 150 |
| Styrene | 200 |
| Methyl methacrylate | 50 |
| Ethyl acrylate | 250 |
| 2-ethyl hexyl acrylate | 100 |
| Polyester resin of Example 3 | 300 |
| Triethyl amine | 3 |
| Azobisbutyronitrile | 5 |
| Tertiary dodecyl mercaptan | 20 |

Following the procedure of Example 2, an interpolymer is produced having the following characteristics:

| | |
|---|---|
| Solids (percent) | 52.7 |
| Viscosity (Gardner-Holdt) | T–U |
| Color (Gardner-Holdt) | 2–3 |

The interpolymer of the present Example is evaluated as a white enamel containing 28% of titanium dioxide and 32% of non-volatile resin. The enamel is applied on aluminum using #40 W.W. rod draw downs and baked for one minute at 500° F.

The following results are obtained:

| | |
|---|---|
| Gloss and appearance | Excellent. |
| Pencil hardness | 2H. |
| Adhesion | Excellent. |
| Reverse Impact | Pass 50 in lbs. |
| Bond fabrication | Very good. |

EXAMPLE 5

An oil modified polyester resin is prepared from the following ingredients:

| | Parts by weight |
|---|---|
| Adipic acid | 140 |
| Tall oil fatty acids | 380 |
| Dehydrated castor oil fatty acids | 250 |
| Phthalic anhydride | 570 |
| Crotonic acid | 200 |
| Glycerine | 505 |

Procedure of Preparation

All of the ingredients are charged to a reaction flask and heated to 420° F. using a light nitrogen sparge. The mixture is held at 420° F. until the acid value is lowered to 9.0 and the product is thinned with n-butanol to 80% solids providing a solution having the following characteristics:

| | |
|---|---|
| Solids (percent) | 79.6 |
| Viscosity (Gardner-Holdt) | X |
| Color (Gardner-Holdt) | 4–5 |
| Acid value (N.V.) | 9.0 |

EXAMPLE 6

| Interpolymer consisting of: | Percent |
|---|---|
| Polyester resin of Example 5 | 21.0 |
| Acrylamide | 10.5 |
| Styrene | 21.0 |
| Methyl Methacrylate | 5.5 |
| Ethyl Acrylate | 31.5 |
| 2-ethyl hexyl acrylate | 10.5 |
| | 100.0 |

The interpolymer is prepared using the procedure described in Example 2 and the following materials and proportions:

| | Grams |
|---|---|
| Xylol | 333 |
| n-Butanol | 83 |
| 40% formaldehyde solution in n-butanol | 45 |
| Polyester resin of Example 5 | 250 |
| Acrylamide | 100 |
| n-Butanol | 130 |
| Butyl Cellosolve | 215 |
| 40% formaldehyde solution in n-butanol | 150 |
| Styrene | 200 |
| Methyl Methacrylate | 50 |
| Ethyl Acrylate | 300 |
| 2-ethyl hexyl acrylate | 100 |
| Di-tertiary butyl peroxide | 5 |
| Triethyl amine | 3 |
| Azobisbutyronitrile | 5 |
| Tertiary dodecyl mercaptan | 8 |

The interpolymer has the following final characteristics:

| | |
|---|---|
| Solids (percent) | 47.2 |
| Viscosity (Gardner-Holdt) | W |
| Color (Gardner-Holdt) | 1–2 |

The resin of the present Example is evaluated as a vehicle for a gloss white coil coating enamel. A grind is prepared containing 28% of titanium dioxide and 32% non-volatile resin. Draw downs on aluminum are made with a #40 W.W. rod and baked 1½ minutes at 475° F. in a gas fired oven. The panels have good gloss, excellent flow and an H–2H pencil hardness. Color retention is very good and the panels pass 40 inch-pounds reverse impact.

EXAMPLE 7

An oil free unsaturated polyester resin is prepared from the following components:

| | Parts by weight |
|---|---|
| Phthalic anhydride | 840 |
| Maleic anhydride | 300 |
| Adipic acid | 495 |
| 2-ethyl hexanol | 75 |
| Diethylene glycol | 1,290 |
| Hydroquinone | 0.6 |

All of the ingredients are charged to a reactor and heated to 410° F. using a nitrogen sparge. The charge is maintained at 410° F. until the acid value was lowered to 45 and the product is cut to 90% solids with n-butanol providing a solution having the following characteristics:

| | |
|---|---|
| Viscosity at 90% solids (Gardner-Holdt) | Y–Z |
| Color (Gardner-Holdt) | 2–3 |
| Acid value | 46 |

EXAMPLES 8 AND 9

Two acrylamide interpolymers are prepared using the same method as described in Example 2.

INTERPOLYMER COMPOSITION (PARTS BY WEIGHT)

| | Example 8 | Example 9 |
|---|---|---|
| Polyester resin of Ex. 7 | 25 | None |
| Acrylamide | 10 | 10 |
| Styrene | 20 | 20 |
| Ethyl acrylate | 20 | 20 |
| Methyl methacrylate | 5 | 5 |
| 2-Ethyl hexyl acrylate | 20 | 20 |
| | 100 parts | 75 parts |

| Charge Composition | Example 8 (w/Polyester) | Example 9 (no Polyester) |
|---|---|---|
| Mixture of aromatic hydrocarbon solvents (see Note 1) | 333 | 333 |
| n-Butanol | 235 | 235 |
| 40% formaldehyde solution in butanol | 45 | 45 |
| Acrylamide | 100 | 100 |
| Butyl Cellosolve | 215 | 215 |
| n-Butanol | 130 | 130 |
| 40% formaldehyde solution in n-butanol | 150 | 150 |
| Styrene | 200 | 200 |
| Methyl methacrylate | 50 | 50 |
| Ethyl acrylate | 200 | 200 |
| 2-ethyl hexyl acrylate | 200 | 200 |
| Polyester resin of Example 7 (as a 100% solids resin without butanol) | 250 | |
| Di-tertiary butyl peroxide | 5 | 5 |
| Azobisbutyronitrile | 5 | 5 |
| Tertiary dodecyl mercaptan | 24 | 24 |
| Triethyl amine | 3 | 3 |

NOTE 1.—A mixture of aromatic hydrocarbon solvents having the following typical physical data.

| | |
|---|---|
| Specific gravity at 60/60° F | 0.8749 |
| Flash, ° F. (Tag closed cup), min | 100 |
| Distillation ASTM (D268): | |
| Initial boiling point, ° F | 306 |
| 10% | 311 |
| 50% | 317 |
| 90% | 327 |
| Dry point, ° F | 343 |
| Viscosity, cp., at 25° C | 0.797 |
| K-B value (toluol=100) | 90 |
| K-B value (after 75% is evaporated) | 98 |
| Mixed aniline point, ° C | 12.0 |
| Percent aromatics | 99.5 |

The interpolymers have the following results:

| | | |
|---|---|---|
| Solids (percent) | 50.1 | 42.6 |
| Viscosity (standard poise) | 5.5 | 0.85 |
| Viscosity (Gardner-Holdt) | T | C |
| Color (Gardner-Holdt) | 1–2 | 1–2 |

The resins of Examples 8 and 9 are utilized in enamel formulations containing 28% of titanium dioxide and 32% of non-volatile resin. Each enamel is ground in a pebble mill to obtain a 7½ N.S. grind gauge reading.

The only difference between Examples 8 and 9 is that to the resin of Example 9, 25% of the polyester resin of Example 7 is blended in, whereas the same proportion of the same polyester has been incorporated in the copolymer molecule in the resin of Example 8.

The enamels are evaluated as a white aluminum coating. They were applied on aluminum using #40 W.W. rod draw downs and baked for 90 seconds at 475° F.

The following results are obtained:

| | Example 8 Interpolymer | Example 9 Cold Blend w/Polyester | Example 9-A Hot Blend w/Polyester |
|---|---|---|---|
| Gloss reading (photovolt 60°) | 92 | 45 | 46. |
| Visual gloss | Excellent | Flat | Flat. |
| Appearance | Excellent | Poor | Poor. |
| Pencil Hardness | 2H | H | H. |
| Flexibility | Excellent | Very Good | Very Good. |
| Impact (forward) | Pass 40 in/lbs. | Pass 40 in/lbs | Pass 40 in./lbs. |
| Adhesion | Excellent | Very Good | Very Good. |
| Mar resistance | Very good | Poor | Poor. |
| Non-volatile resin composition | 100% resin of Example 8 | 75% resin of Example 9, 25% Polyester of Example 7 (cold blend). | 75% resin of Example 9, 25% Polyester of Example 7 * (hot blend). |

*The blend was refluxed 1 hour at 235–240° F. to approximate a conventional hot blending procedure.

The panels of Example 8, containing polyester acrylamide interpolymer, have excellent gloss, superior hardness combined with excellent flexibility and very good mar properties. Color retention is very good. The panels passed 40 inch pound impact.

The panels containing cold and hot blends of the polyester resin with acrylamide polymer showed poor gloss, poor hardness and poor mar properties. Moreover, these blends, when evaluated in colored paints, showed extreme pigment flocculation and color drifting. The Example 8 compositions pigmented excellently and did not drift in color.

EXAMPLE 10

*Preparation of Polyester Containing Reactive Conjugated Double Bonds*

| | Parts by weight |
|---|---|
| Dehydrated castor oil fatty acids | 1040 |
| Isophthalic acid | 400 |
| Glycerine | 645 |
| Hydroquinone | 1 |
| Heat to 420° F. | |
| Hold for acid value of 5.0. | |
| Add: | |
| Polyol (see Note 1 of Example 1) | 200 |
| Phthalic anhydride | 235 |
| Adipic acid | 125 |
| Heat to 420° F. | |
| Hold for acid value of 12.0. | |
| Add n-butanol to 80% solids. | |

Final characteristics of the resin:

| | |
|---|---|
| Solids (percent) | 79.8 |
| Viscosity (Gardner-Holdt) | V–W |
| Color (Gardner-Holdt) | 9–10 |
| Acid value | 11.7 |

EXAMPLE 11

An acrylamide interpolymer was prepared using the same method as described in Example 2.

INTERPOLYMER COMPOSITION

| | Percent |
|---|---|
| Polyester of Example 10 | 25 |
| Acrylamide | 10 |
| Styrene | 10 |
| Ethyl acrylate | 10 |
| 2-ethyl hexyl acrylate | 20 |
| Methyl methacrylate | 5 |

CHARGE COMPOSITION

| | Grams |
|---|---|
| Mixture of aromatic hydrocarbon solvents (see Note 1, Examples 8 and 9) | 350 |
| n-Butanol | 100 |
| 40% formaldehyde solution in n-butanol | 45 |
| Acrylamide | 100 |
| n-Butanol | 130 |
| Butyl Cellosolve | 315 |
| 40% formaldehyde solution in n-butanol | 150 |
| Styrene | 300 |
| Methyl methacrylate | 50 |
| Ethyl acrylate | 100 |
| 2-ethyl hexyl acrylate | 200 |
| Polyester of Example 10 | 330 |
| Triethyl amine | 3 |
| Di-tertiary butylperoxide | 5 |
| Azobisbutyronitrile | 5 |
| Tertiary dodecyl mercaptan | 10 |

Using the procedure of Example 2, the interpolymer product has the following characteristics:

| | |
|---|---|
| Solids (percent) | 50.5 |
| Viscosity (Gardner-Holdt) | U-V |
| Color (Gardner-Holdt) | 2-3 |

This resin was evaluated as a vehicle for a gloss white coil coating enamel. A grind was prepared containing 28% titanium dioxide and 32% non-volatile resin. Draw downs on aluminum were made with a #40 W.W. rod and baked 1½ minutes at 475° F. in a gas fired oven. The panels had good gloss, excellent flow and an H-2H pencil hardness. Color retention was very good. The panels passed 40 inch-pounds reverse impact.

EXAMPLE 12

*Preparation of Interpolymers without Acrylamide from Unsaturated Polyesters in which the Unsaturation is Confined to Components in the Polyester Side Chains*

Following the procedure described in Example 2, 30 parts of the polyester of Example 1 in the form of an 80% solids solution in n-butanol containing crotonic acid (the polyester of Example 1 includes a proportion of crotonic acid) are interpolymerized with 50 parts of styrene, 17 parts of ethyl acrylate and 3 parts of glacial acrylic acid. The free-radical generating polymerization catalyst is cumene hydroperoxide used in an amount of 2% by weight, based on the total weight of monomers. The monomers are added over a two hour period and the reaction mixture is maintained at reflux for six hours after the addition of monomers is completed. The copolymer forms good films upon baking for ten minutes at 350° F. Desirably, the copolymer of the present Example is mixed with 20% by weight, based on the weight of the mixture of copolymer and additional resinous components of the epoxy resin specified in Note 2 of Table I. The hydroxyl polyester forming part of the copolymer is reactive with the oxirane functionality of the epoxy resin, especially in the presence of the acrylic acid contained in the copolymer to promote cure upon baking. Similarly, the copolymers of the present example may be mixed with 20% by weight of urea, melamine or other amino triazine-aldehyde thermosetting resin condensation products and cured in this way.

It is of interest to note that the viscosity of the interpolymer varies directly with the reactivity of the unsaturated group contained in the unsaturated polyester which is selected, the fact that the polyesters have the same amount of unsaturation and the same hydroxyl number not being of significance. This is clear evidence of the fact of copolymerization and it also explains the preference for polyesters when the unsaturation is in a side chain and not in the polyester backbone where it is highly reactive leading to gelling tendencies which make production of superior products difficult. Moreover, the presence of unsaturation in the polyester is of primary significance as is established by replacing maleic acid in the polyester by succinic acid. The maleic acid polyester tends to gel, but it is a clear product. The same succinic acid polyester does not gain viscosity rapidly. Moreover, the product is cloudy, demonstrating lack of incorporation of polyester into a single component system.

The fact of copolymerization can also be demonstrated by solvent extraction. Thus, physical blends of acrylamide interpolymer and unsaturated polyester resins can be separated in some instances by solvent extraction. The separation is more readily formed on cold blends, but it is also effective even after the physical blend has been refluxed for many hours. On the other hand, interpolymers formed by coreacting the same unsaturated polyester with the same monomer components of the acrylamide interpolymer provides a single component system which is not separated by the same solvent extraction procedure used to separate the physical mixture.

The invention is defined in the claims which follow.

I claim:

1. A non-gelled interpolymer of (A) from 4–45% by weight of an amide of a monoethylenically unsaturated carboxylic acid, (B) at least one other polymerizable monoethylenically unsaturated monomer copolymerizable with said amide, and (C) from 5–50% by weight of polyethylenically unsaturated polyester copolymerizable with said amide and said other monoethylenically unsaturated monomer, said unsaturated polyester having a viscosity in n-butanol at 80% solids in the range of from C to Z–6 measured on the Gardner-Holdt scale at 25° C., containing about 0.005 to 0.40 gram mol of ethylenically unsaturated component per 100 grams of polyester, and the unsaturation of said unsaturated polyester being selected from the group consisting of (1) alpha,beta-unsaturation; (2) beta,gamma-unsaturation; and (3) conjugated unsaturation, said interpolymer having amido hydrogen atoms replaced by the structure

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical, said weight proportions being based on the total weight of said components (A), (B), and (C).

2. An interpolymer as recited in claim 1 in which said amide is an acrylamide and said component (B) is a monomer having a $CH_2\!\!=\!\!C\!<$ group.

3. An interpolymer as recited in claim 2 in which the amido groups of the acrylamide component of said interpolymer are reacted with formaldehyde and an alkanol containing from 3–8 carbon atoms.

4. An interpolymer as recited in claim 2 in which said unsaturated polyester is an oil-modified polyester containing at least about 20% by weight of oil, based on the weight of the polyester.

5. An interpolymer as recited in claim 1 in which said amido hydrogen atoms are replaced by the structure —$CH_2$—OH, said structure being at least partially etherified with n-butanol.

6. An interpolymer as recited in claim 1 in which said polyester is an hydroxyl-functional polyester having an hydroxyl number of from 10–300.

7. A non-gelled interpolymer of (A) from 4–45% by weight of an acrylamide, (B) at least one other polymerizable monoethylenically unsaturated monomer copolymerizable with said acrylamide, and (C) from 5–50% by weight of polyethylenically unsaturated polyester copolymerizable with said acrylamide and said other monoethylenically unsaturated monomer, said unsaturated polyester having a viscosity in n-butanol at 80% solids in the range of from C to Z–6 measured on the Gardner-Holdt scale at 25° C., containing about 0.03–0.3 gram mol of ethylenically unsaturated component per 100 grams of polyester, and the unsaturation of said unsaturated polyester being essentially confined to side chains of said polyester, said interpolymer having amido hydrogen atoms replaced by the structure

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical, said weight proportions being based on the total weight of said components (A), (B), and (C).

8. An interpolymer as recited in claim 7 in which the unsaturation in said unsaturated polyester is conferred by crotonic acid in an amount of from 0.03–0.3 gram mol of crotonic acid per 100 grams of polyester.

9. An interpolymer as recited in claim 7 in which the unsaturation in said unsaturated polyester is conferred by an allyl alcohol in an amount of from 0.03–0.3 gram mol of an allyl alcohol per 100 grams of polyester.

10. An interpolymer as recited in claim 7 in which said polyester is an hydroxyl-functional polyester having an hydroxyl number of from 10–300.

11. An interpolymer as recited in claim 7 in which said unsaturated polyester is an oil-modified polyester containing at least about 20% by weight of oil, based on the weight of the polyester.

12. An interpolymer as recited in claim 7 in which said unsaturated polyester is an oily-modified polyester containing from 20–30% by weight of oil, based on the weight of the polyester.

13. An article having a metal surface having as a coating thereon a hardened resinous composition of claim 1.

References Cited by the Examiner
UNITED STATES PATENTS

| | | | |
|---|---|---|---|
| 2,173,005 | 9/39 | Strain | 260—856 |
| 2,598,664 | 6/52 | Kropa | 260—22 |
| 2,940,945 | 6/60 | Christenson et al. | 260—21 |
| 2,978,437 | 4/61 | Christenson et al. | 260—72 |
| 3,037,963 | 6/62 | Christenson et al. | 260—72 |

LEON J. BERCOVITZ, *Primary Examiner.*

MILTON STERMAN, *Examiner.*